C. W. MANZEL.
LUBRICATING GUN.
APPLICATION FILED SEPT. 18, 1920.
1,424,504.
Patented Aug. 1, 1922.
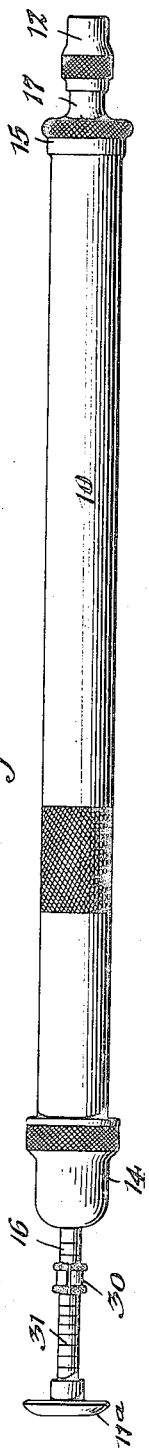
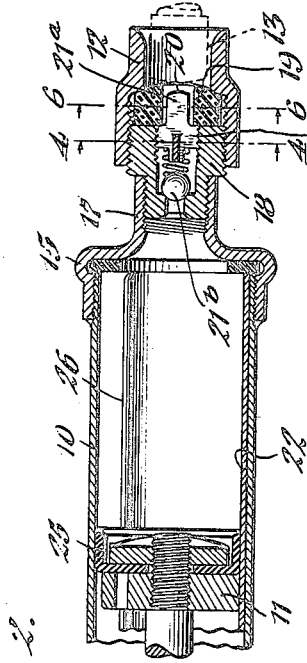
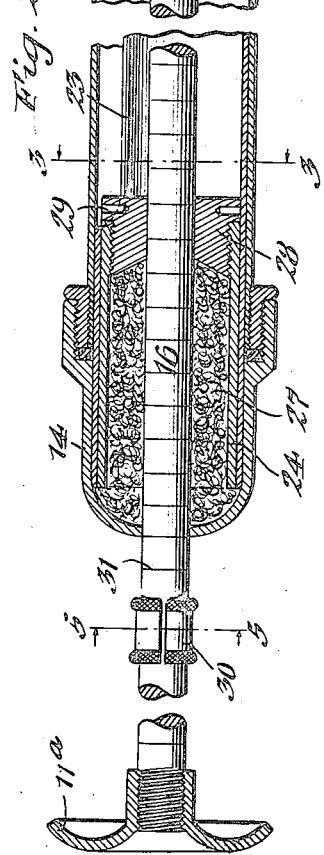
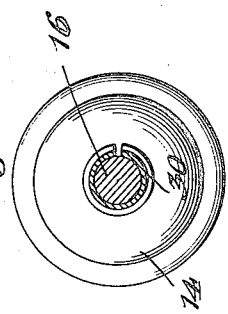
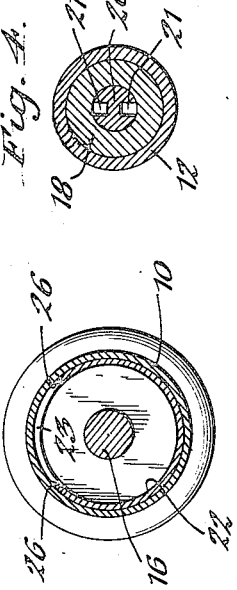
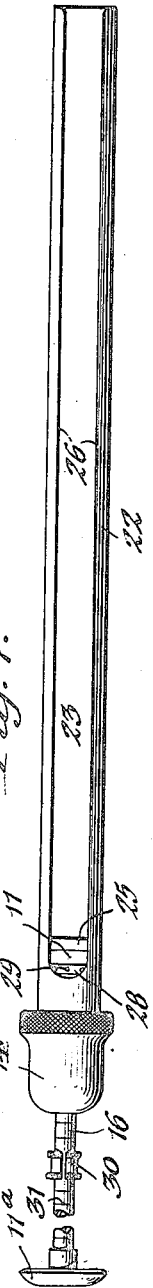
Inventor;
Charles W. Manzel,
by Geyer & Popp
Attorneys.

UNITED STATES PATENT OFFICE.

CHARLES W. MANZEL, OF BUFFALO, NEW YORK.

LUBRICATING GUN.

1,424,504.  Specification of Letters Patent.  Patented Aug. 1, 1922.

Application filed September 18, 1920. Serial No. 411,160.

*To all whom it may concern:*

Be it known that I, CHARLES W. MANZEL, a citizen of the United States, residing at Buffalo, in the county of Erie and State of New York, have invented new and useful Improvements in Lubricating Guns, of which the following is a specification.

This invention relates to a lubricating gun or force pump intended more especially to supply oil or grease to the various bearings of automobiles, motor trucks, tractors and similar vehicles, each of such bearings having a feed-nipple containing a dust-excluding check valve and adapted to receive a guide nozzle at the delivery end of the gun. The device is however equally applicable to the bearings and joints of various other mechanisms.

One object of the invention is to render the gun practically oil-tight, so as to obtain a high pressure and insure thorough oiling of the bearings and other parts, and also avoid soiling of the user's hands and clothing.

Further objects are to facilitate filling of the gun and to improve the same in other respects.

In the accompanying drawings: Figure 1 is a side elevation of the gun. Figure 2 is a fragmentary longitudinal section thereof, on an enlarged scale. Figures 3, 4, 5 and 6 are cross sections thereof, on the correspondingly numbered lines in Fig. 2. Figure 7 is a side elevation of the magazine, cap and piston, withdrawn from the pump cylinder.

Similar characters of reference indicate corresponding parts throughout the several views.

The gun illustrated in the drawings is designed more particularly for supplying grease to ball and roller bearings, but it may also be used to feed oil to ordinary or solid bearings or other parts. The gun has a comparatively long and slender barrel or cylinder 10 containing a sliding piston 11 provided with a convenient handle 11ᵃ. At its front end, the barrel is preferably provided with a tubular guide or nozzle 12 which is adapted to slip over the projecting feed nipple of a bearing, vehicle spring or other part requiring lubrication, a fragment of this nipple being shown by dotted lines at 13 in Fig. 2. This nozzle, which is a rigid part of the pump-cylinder, is controlled by and engaged with the feed nipple by the gun itself which acts as a long handle for this purpose and enables remote as well as near bearings to be conveniently reached through any available space without the necessity of going or reaching under the car and soiling the hands or clothing.

The pump barrel is closed at its ends by caps or heads 14, 15, the rear one being preferably a relatively long detachable screw cap through which the rod 16 of the pump-piston passes. Projecting from the front head 15 is a hollow neck 17 into which the hollow stem of a discharge nipple 18 is screwed or otherwise secured. This nipple carries the guide nozzle 12 of the pump.

Housed within the guide nozzle and seated against the face of the pump nipple 18 is a packing washer or gasket 19 of rubber or other appropriate material, the bore of which registers with the bore of said nipple and which is adapted to seat against the head of any one of the feed-nipples 13. Said nipple-head is preferably convex or conical, as shown, and the bore of the packing gasket is somewhat larger than the extreme end of the feed nipple, so that upon passing the guide nozzle over the feed nipple and pushing the pump toward it, the conical end of said nipple is wedged into the bore of the gasket, forming a reliable oil-tight seal or joint between these parts which will withstand a pumping pressure of several hundred pounds to the square inch and which is at the same time readily separable or detachable by simply relieving the forward pressure on the pump and withdrawing its guide nozzle from the bearing-nipple, thus rendering it unnecessary to reach under the car to attach or detach said nozzle directly by hand.

To prevent undue constriction of the gasket-bore by the bearing nipple under the forward pressure of the pump or its plunger, a fixed core or stem 20 carried by the discharge-nipple 18, extends through said bore, as shown in Fig. 2. The core is channeled lengthwise for the passage of the grease into the bearing-nipple. In the preferred construction shown, the rear portion of the core is provided in opposite sides with longitudinal grooves or channels 21, while its front portion has a diametrical saw-slit or channel 21ᵃ forming a continuation of the channels 21.

A suitable spring-pressed check valve 21ᵇ, opening toward the guide-nozzle 12, is preferably arranged in the discharge nipple 18. As the grease is ejected into the feed-nipple 13 under considerable pressure, it tends to expand and ooze out of the gun, after relieving the piston from pressure and removing the gun from the feed-nipple. By employing said check valve, the escape of grease from the gun is prevented under these conditions.

Closely fitted in the pump barrel and brazed or otherwise secured at its rear end within the screw cap 14 is a cylindrical, open-ended grease magazine or receptacle 22. The latter extends practically throughout the length of the barrel and is provided in its side with a longitudinally filling slot or aperture 23 through which the grease is introduced with a spoon or similar implement after withdrawing the magazine from the pump barrel. The rear portion of the magazine is preferably reinforced by a metallic tube or bushing 24 brazed or otherwise secured to it. This bushing expands the magazine into said cap and keeps it straight and true therein, permitting the cap to be properly screwed upon the pump barrel.

The packing 25 of the piston is preferably of cupped form, as shown, and the side thereof which faces the magazine-slot 23, protudes through the latter and bears against the wall of the pump barrel, as shown in Figs. 2 and 3, to prevent leakage of the grease past the piston at that point. To still further guard against such leakage, said slot has oblique or knife edges 26 arranged at an angle to radial lines intersecting the axis of the magazine, as shown in Fig. 3. This construction avoids the formation of gaps or spaces between the said edges and the adjacent edges of the piston-packing, which would exist if said slot-edges were square or abrupt.

The bushing 24 and the rear portion of the screw cap 14 perform the additional function of a stuffing box for the adjacent rear portion of the piston rod 16. 27 indicates the packing of this box which is tightly compressed within said cap and said bushing by a gland 28, screwed into the front end of the bushing and having radial sockets 29 adapted to receive a pin or wrench for turning it. By the use of this internal stuffing box, any grease which may leak behind the piston and adhere to the piston rod, is wiped off by the packing which envelops the rod, rendering the gun clean in use and preventing soiling of the hands.

When it is desired to fill or refill the grease magazine, the rear cap 14 is simply unscrewed and the magazine fully withdrawn from the pump barrel. The piston is then drawn back against the gland 28 and the magazine filled, after which it is replaced and the cap again applied.

In lubricating a bearing or other part with this gun, the latter is joined to the bearing-nipple 13 by passing its guide nozzle 12 over it and the plunger is then pushed forward a greater or less distance, according to the amount of grease required by the bearing, some bearings requiring more than others. This pressure against the plunger handle is transmitted through the grease and the pump-body to the packing gasket 19, which is thereby firmly pressed against the end of the bearing-nipple, producing a tight and reliable seal, as before described.

To guide the user in lubricating the bearings, the plunger rod may be provided with an adjustable gage or stop 30 adapted to strike the rear cap of the pump barrel. The gage shown in the drawings consists of a split collar which tightly embraces the said rod and is held in place by friction. If desired, the plunger rod may be provided with a scale 31 with which the gage collar cooperates.

If desired, the gun may be used with oil as well as grease. In filling it with oil, the magazine is not fully withdrawn from the barrel but only far enough to permit the oil to be introduced into the magazine through the exposed upper portion of its filling slot.

By utilizing the screw cap 14 both as a manipulating and securing device for the magazine and as a stuffing box for the piston rod, the number of parts is reduced and the cost of the gun correspondingly lessened.

I claim as my invention:

1. A lubricating gun, comprising a pump-barrel, a lubricant magazine removably arranged in the barrel and having a reinforcing tube in its rear portion, and a cap secured to the rear end of said magazine and removably applied to the adjacent end of the pump barrel.

2. A lubricating gun, comprising a pump-barrel, a cap removably applied to the rear end of the barrel, a lubricant magazine removably arranged in the barrel and secured to said cap, a piston in said magazine having a rod extending through said cap, packing arranged in said cap and the adjacent portion of the magazine and bearing against the piston rod, and means for compressing the packing.

3. A lubricating gun, comprising a pump-barrel, a cap removably applied to the rear end of the barrel, a lubricant magazine removably arranged in the barrel and secured to said cap, a piston in said magazine having a rod extending through said cap, a bushing secured in the rear portion of said magazine, packing arranged in said bushing and said cap around the piston rod, and a clamping gland arranged in the front end of said bushing and bearing against said packing.

CHARLES W. MANZEL.